(12) United States Patent
Hachiya et al.

(10) Patent No.: US 8,369,223 B2
(45) Date of Patent: Feb. 5, 2013

(54) PACKET PROCESSING APPARATUS, INTERFACE UNIT AND METHOD THEREOF

(75) Inventors: Koji Hachiya, Fukuoka (JP); Tetsuo Ehara, Fukuoka (JP); Yasuyuki Mitsumori, Kawasaki (JP); Kanta Yamamoto, Kawasaki (JP); Junichi Kawaguchi, Fukuoka (JP); Yuichiro Katsura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 12/716,632

(22) Filed: Mar. 3, 2010

(65) Prior Publication Data

US 2010/0246425 A1    Sep. 30, 2010

(30) Foreign Application Priority Data

Mar. 31, 2009 (JP) ................................. 2009-088236

(51) Int. Cl.
*H04J 1/16* (2006.01)

(52) U.S. Cl. ..................................... 370/236.1; 370/362

(58) Field of Classification Search .................. 370/225, 370/227, 228, 236.1, 236.2, 241.1, 242, 248, 370/401, 400, 389, 360, 359, 390, 362

See application file for complete search history.

(56) References Cited

U.S. PATENT DOCUMENTS

| | | | |
|---|---|---|---|
| 6,532,088 B1 * | 3/2003 | Dantu et al. ..................... | 398/43 |
| 7,197,008 B1 * | 3/2007 | Shabtay et al. ............... | 370/218 |
| 8,089,865 B2 * | 1/2012 | Mizutani et al. .............. | 370/223 |
| 8,089,876 B2 * | 1/2012 | Katsura et al. ............. | 370/230.1 |
| 2007/0214412 A1 * | 9/2007 | Arquie et al. ................. | 715/526 |
| 2010/0046533 A1 * | 2/2010 | Kuramoto et al. ............ | 370/401 |

FOREIGN PATENT DOCUMENTS

| | | |
|---|---|---|
| JP | 7-202897 | 8/1995 |
| JP | 2008-211704 | 9/2008 |

OTHER PUBLICATIONS

Japanese Office Action issued Jan. 11, 2011 in corresponding Japanese Patent Application 2009-088236.

* cited by examiner

*Primary Examiner* — Brenda H Pham
(74) *Attorney, Agent, or Firm* — Staas & Halsey LLP

(57) ABSTRACT

A packet processing apparatus includes a plurality of communication connecting unit each connected with a communication partner apparatus using one of a work path and a protection path, connecting unit for connecting, using a data bus, the plurality of communication connecting unit with one another; determination unit for, when a packet sent from the communication partner apparatus is received by one of the communication connecting unit, determining whether the packet is a maintenance packet that is used for monitoring a connection state with the communication partner apparatus; and transmitting unit for, when it is determined that the packet is a maintenance packet by the determination unit, transmitting the maintenance packet to the plurality of communication connecting unit using the data bus via the connecting unit.

6 Claims, 15 Drawing Sheets

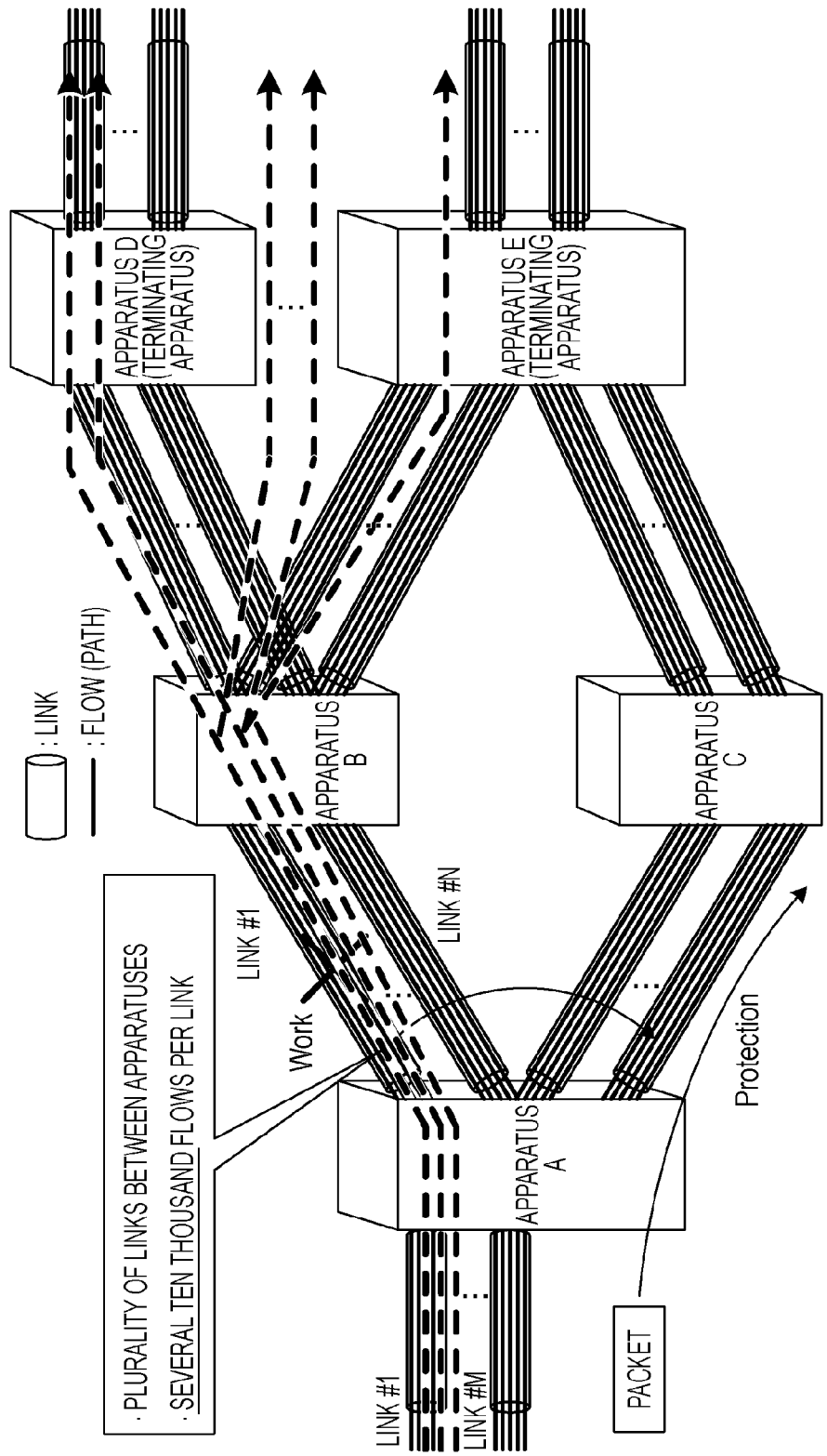

PACKET PROCESSING APPARATUS, INTERFACE UNIT AND METHOD THEREOF

CROSS-REFERENCE TO RELATED APPLICATIONS

This application is based upon and claims the benefit of priority of the prior Japanese Patent Application No. 2009-88236, filed on Mar. 31, 2009, the entire contents of which are incorporated herein by reference.

FIELD

Embodiment(s) described herein relate to a packet processing apparatus, an interface unit and method thereof.

BACKGROUND

In recent years, in addition to low cost and high speed, high reliability and high quality have been required for a wide area network, such as a metro Ethernet (registered trademark). Accordingly, fault recovery and redundancy, such as those provided by SONET (synchronous optical network)/SDH (synchronous digital hierarchy), have been required.

In existing networks, as shown in FIG. 11, a plurality of flows (paths) are provided in each of links in a network. Fault is monitored on a flow-to-flow basis. If an error occurs, a Work path system is switched to a Protection path system. In general, in existing networks as shown in FIG. 11, a plurality of links are provided between apparatuses, and several hundred flows are provided in each of the links.

In such existing networks, fault monitoring is accomplished by individual apparatuses. If a fault is detected, a maintenance packet (fault information) is sent to an upstream interface (IF) unit in the apparatus, and the upstream IF unit examines the maintenance packet. Thus, the system can be switched.

For example, this fault monitoring is described with reference to FIG. 12. In FIG. 12, an apparatus A is connected with an apparatus B using a Work path via an IF unit (#6) and a Protection path via an IF unit (#7). In this case, each of the IF unit (#6) and the IF unit (#7), which are disposed on an ingress side of the apparatus A, identifies whether, for example, a received packet input to the unit itself is a maintenance packet, such as CC of Service-OAM, or a normal data packet (refer to FIG. 13). In addition, each of the IF unit (#6) and the IF unit (#7) acquires information indicating whether the packet is destined for a central processing unit (CPU) or not and a number assigned to each of the flows (a flow ID). Note that the term "CC of Service-OAM" refers to continuity check of service-operations administration maintenance.

If each of the IF unit (#6) and the IF unit (#7) identifies that the input packet is a maintenance packet, flow identification and destination control indicated by (1) shown in FIG. 13 are performed. More specifically, each of the IF unit (#6) and the IF unit (#7) sends, to the CPU of the IF unit itself, the maintenance packet with a flow ID attached thereto. Subsequently, the CPU of the IF unit (#6) or the IF unit (#7) sends the maintenance packet to an IF unit (#1), which is one of upstream units identified by the flow ID, via a Main CPU Unit (MCU) unit connected thereto using a control bus. Upon detecting the occurrence of a fault in the Work path through the received maintenance packet, the IF unit (#1) switches the Work path to a Protection path and performs data control.

However, if each of the IF unit (#6) and the IF unit (#7) identifies that the input packet is a data packet, flow identification and destination control indicated by (2) shown in FIG. 13 are performed. More specifically, each of the IF unit (#6) and the IF unit (#7), which are units disposed on an ingress side, sends the data packet to the IF unit (#1), which is one of upstream units identified by the flow ID, via a data bus. In this way, in existing processing, a maintenance packet is sent to an upstream target IF unit over the low-speed control bus by unicasting.

When a plurality of upstream IF units are provided, that is, when a plurality of upstream IF units use a single Work path and a single IF unit, the path switching process can be performed in a similar manner. For example, as shown in FIG. 14, the IF unit (#6) disposed on the ingress side sends a received maintenance packet to the MCU unit. The MCU unit then detects the destinations of the received maintenance packet from, for example, the header of the packet and generates copies of the maintenance packet for the number of destinations. Thereafter, the MCU unit sends the generated maintenance packets to IF units (#1, #2, and #4) which are detected destinations of the packet and are units disposed on an egress side. Subsequently, upon detecting the occurrence of a fault in the Work path through the received maintenance packet, each of the IF units (#1, #2, and #4) switches the Work path to a Protection path and performs data control.

In an existing network as described in Japanese Unexamined Patent Application Publication No. 2008-211704, path protection in which the Work path is switched to the Protection path is performed. Note that, in general, a control system bus having a transfer rate of several hundred Mbps is used for the path through which the maintenance packet illustrated in FIGS. 12 and 14 is sent to the IF unit (the upstream IF unit) disposed on the egress side, that is, the path from the unit on the ingress side to the unit on the egress side via the MCU unit. In addition, processing units in each of the IF units are connected with one another using a control system bus having a transfer rate of several hundred Mbps.

SUMMARY

According to an aspect of the invention, a packet processing apparatus includes a plurality of communication connecting unit each connected with a communication partner apparatus using one of a work path and a protection path, connecting unit for connecting, using a data bus, the plurality of communication connecting unit with one another, determination unit for, when a packet sent from the communication partner apparatus is received by one of the communication connecting unit, determining whether the packet is a maintenance packet that is used for monitoring a connection state with the communication partner apparatus, and transmitting unit for, when determining that the packet is a maintenance packet by the determination unit, transmitting the maintenance packet to the plurality of communication connecting unit using the data bus via the connecting unit.

The object and advantages of the invention will be realized and attained by unit of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 15 illustrates a wide area network.

DETAILED DESCRIPTION OF THE PREFERRED EMBODIMENTS

Figure 1:
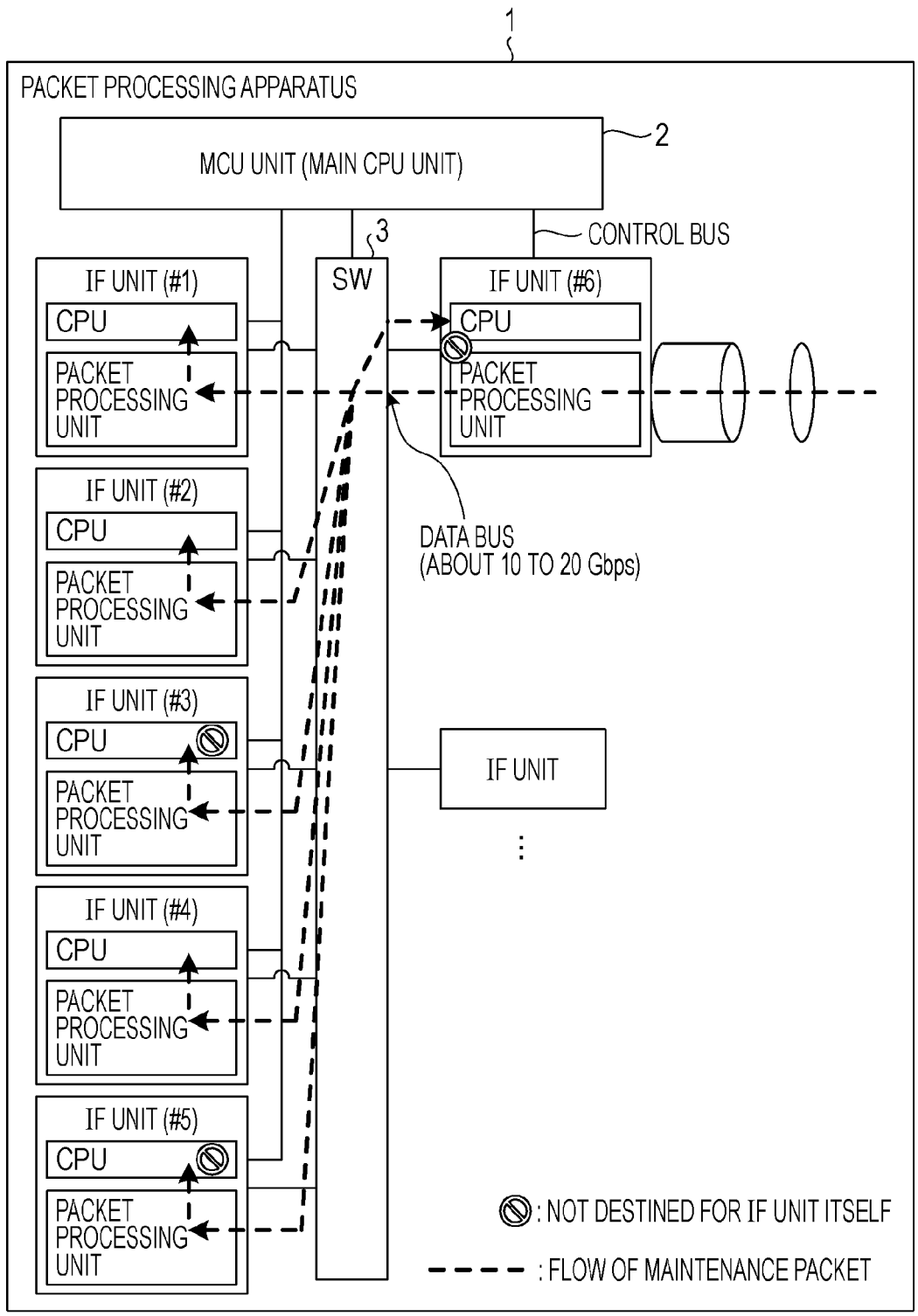
FIG. 1 illustrates an exemplary configuration of a packet processing apparatus according to an embodiment of the invention.

Reference will now be made in detail to the embodiments, examples of which are illustrated in the accompanying drawings, wherein like reference numerals refer to the like elements throughout. The embodiments are described below to explain the present invention by referring to the figures.

However, the above-described existing technology has a disadvantage in that when a fault occurs, it is difficult to provide high-speed path switching in the contemporary network including an increased number of apparatuses and an increased number of flows subjected to fault monitoring.

More specifically, as shown in FIG. 15, contemporary networks include a plurality of links between apparatuses, and each of the links includes several ten thousand flows. Since the number of apparatuses in a single network has been increased, the number of flows subjected to fault monitoring is increased. Accordingly, it takes significant time to send maintenance packets for all of the flows to all of the upstream IF units in the apparatus. Consequently, if path switching from a Work path to a Protection path is performed for all of the flows, it is difficult to satisfy the requirement for fault recovery time.

In addition, redundancy (a Protection path for a Work path) is provided to each of the flows, not each of the links (the ports). Accordingly, a maintenance packet is assigned to each of the flows. Consequently, as the number of flows increases, the number of maintenance packets increases. Thus, an enormous number of maintenance packets are sent to the CPU and, therefore, the CPU load and a message time processed by the CPU significantly increase. Therefore, a sending speed of a fault information message is decreased. As a result, if simultaneous path switching for all flows occurs, the CPU load is significantly increased and, therefore, it is difficult to provide high-speed switching for maintaining the designed network quality.

As described above, even path switching increases the CPU load. Accordingly, normal processing performed by the CPU, such as collection of statistical information and transmission and reception of control information, has a negative impact. In addition, if the performance of the CPU is increased in order to reduce the CPU load, a change in the configuration of the apparatus may be required, or the cost of the CPU may be increased. Accordingly, this solution is not practical.

Accordingly, the invention provides a packet processing apparatus and an interface unit capable of providing high-speed path switching when a fault occurs even in a wide area network.

According to an embodiment of the invention, a packet processing apparatus includes a plurality of communication connecting unit each connected to a communication partner apparatus using one of a work path and a protection path, connecting unit for connecting, using a data bus, the plurality of communication connecting unit with one another, determination unit for, when a packet sent from the communication partner apparatus is received by one of the communication connecting unit, determining whether the packet is a maintenance packet that is used for monitoring a connection state with the communication partner apparatus, and transmitting unit for, when it is determined that the packet is a maintenance packet by the determination unit, transmitting the maintenance packet to the plurality of communication connecting unit using the data bus via the connecting unit.

According to an embodiment of the invention, when a fault occurs, a packet processing apparatus can advantageously perform high-speed path switching even in a wide area network.

A packet processing apparatus and an interface unit according to exemplary embodiments of the invention are described below with reference to the accompanying drawings. It should be appreciated that the exemplary embodiments are only examples, and are not intended to limit the scope, applicability, or configuration of the invention in any way.

In a network including the packet processing apparatuses according to an embodiment of the invention (refer to FIG. 15), a plurality of links are established between the packet processing apparatuses. In addition, several ten hundred flows exist in each of the links. Furthermore, one of the packet processing apparatuses is connected to another packet processing apparatuses serving as a communication partner via a plurality of links used in different ways (e.g., a link formed from a Work path for normal use and a link formed from a Protection path used when a fault occurs). For example, a packet processing apparatus A is connected to a packet processing apparatus B via at least two links (a link formed from a Work path and a link formed from a Protection path).

Under normal conditions, the packet processing apparatus connected to a communication partner apparatus exchanges data with the communication partner apparatus via a Work path. However, if a fault occurs in the Work path, the packet processing apparatus exchanges data with the communication partner apparatus via a Protection path. In this way, by performing path protection, the packet processing apparatus performs fault recovery and maintains redundancy. Thus, low cost, high speed, high reliability, and high quality are realized.

As shown in FIG. 1, a packet processing apparatus 1 that performs the above-described path protection includes a MCU unit 2, IF units (#1) to (#6), and a SW 3. Each of the IF units (#1) to (#6) is connected to the SW 3 via a high-speed data bus operating at several tens Gbps. In addition, each of the IF units (#1) to (#6) is connected to the MCU unit 2 via a low-speed control bus operating at several hundred Mbps. FIG. 1 illustrates an exemplary configuration of the packet processing apparatus according to an embodiment.

The packet processing apparatus 1 having such configuration can perform high-speed path switching when a fault occurs even in a wide area network. More specifically, according to an embodiment, when a packet is received by one of a plurality of IF units connected to the communication partner apparatus via a Work path or a Protection path, the packet processing apparatus 1 determines whether the received packet is a maintenance packet using, for example, the header of the packet. If the packet processing apparatus 1 according to an embodiment determines that the received packet is a maintenance packet, the packet processing apparatus 1 sends the maintenance packet to the plurality of IF units via the SW 3 using the high-speed data bus, not via the MCU unit 2 using the low-speed control bus.

In this way, like the data packet, the packet processing apparatus 1 according to an embodiment can send even a maintenance packet to another IF unit using the data bus, not the control bus. Accordingly, even when the number of packets exchanged between apparatuses is increased, as in a wide area network in which a plurality of links are established between apparatuses and several ten thousand flows exist in each link, the packet processing apparatus 1 can output a maintenance packet to another IF unit at high speed. Therefore, each of the IF units of the packet processing apparatus 1 can perform path switching at high speed when a fault occurs.

An exemplary configuration of the packet processing apparatus 1 according to an embodiment shown in FIG. 1 is described next. As shown in FIG. 1, the packet processing apparatus 1 includes the MCU unit 2, the IF units (#1) to (#6), and the SW 3. In this example, six IF units (#1) to (#6) are shown. However, the number of the IF units is not limited to six.

The MCU unit 2 includes an internal memory for storing a control program of the packet processing apparatus 1, programs for defining various processing procedures, and necessary data. The MCU unit 2 performs various processing. In addition, in general, the MCU unit 2 is connected to each of the IF units (#1) to (#6) and the SW 3 using the low-speed control bus operating at several hundred Mbps. Note that the MCU unit 2 performs various processing using this low-speed control bus.

Each of the IF units (#1) to (#6) serves as a processing unit that performs exchange of packets with a communication partner apparatus using a flow and that performs path switching. The IF unit is described in more detail below with reference to FIG. 2. In addition, in the packet processing apparatus, an IF unit that has received a packet from the communication partner apparatus is referred to as a "unit on an ingress side", and an IF unit that transmits a packet is referred to as a "unit on an egress side". In general, each of the IF units (#1) to (#6) is connected to the SW 3 and is also connected to the MCU unit 2 using a high-speed data bus operating at several tens Gbps.

Figure 2:
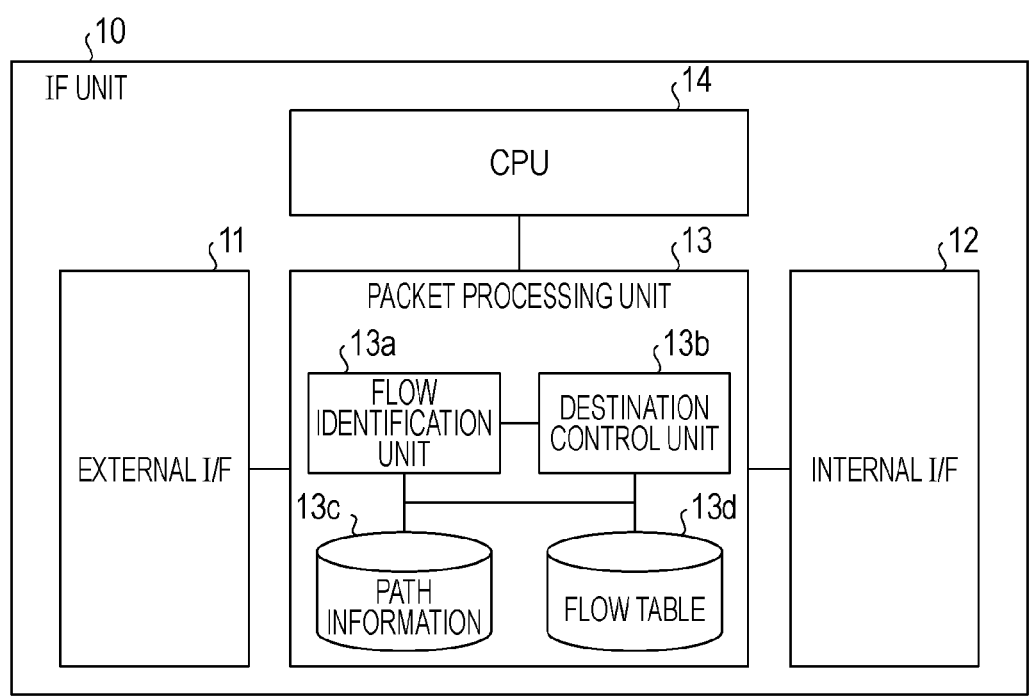
FIG. 2 is a block diagram illustrating an exemplary configuration of an IF unit.

An exemplary configuration of each of the IF units (#1) to (#6) is described next with reference to FIG. 2. Since the IF units (#1) to (#6) has the same configuration, the IF units (#1) to (#6) are collectively referred to as a "IF unit 10". FIG. 2 is a block diagram illustrating the configuration of the IF unit 10. As shown in FIG. 2, the IF unit 10 includes an external interface (I/F) 11, an internal interface (I/F) 12, a packet processing unit 13, and a CPU 14.

The external I/F 11 serves as an interface that receives a packet from a different packet processing apparatus and sends a packet to a different packet processing apparatus. More specifically, the external I/F 11 includes a plurality of links, such as a link containing a Work path and a link containing a Protection path. The external I/F 11 is connected to the communication partner apparatus using the links (paths and flows). Thus, the external I/F 11 receives various types of packet, such as a data packet sent from the communication partner apparatus and a maintenance packet, and outputs the packet to a packet processing unit 13 (described below). In addition, the external I/F 11 sends the data packet and the maintenance packet output from the packet processing unit 13 to a different packet processing apparatus.

In order to identify each of the paths (flows) connected to the communication partner apparatus, the external I/F 11 assigns a flow ID to each of the flows. For example, when the external I/F 11 has 10 links each including 100 flows, the external I/F 11 sequentially assigns flow IDs to a 1st flow of a 1st link to a 100th flow of a 10th link.

The internal I/F 12 serves as an interface that sends a packet received from an external packet processing apparatus to another IF unit of the packet processing apparatus that includes the internal I/F 12 and receives a packet from another IF unit of the packet processing apparatus that includes the internal I/F 12. More specifically, the internal I/F 12 receives and sends a maintenance packet and a data packet from and to another IF unit of the packet processing apparatus that includes the internal I/F 12 via the SW 3 connected to the internal I/F 12 using a high-speed data bus. In addition, the internal I/F 12 outputs, to the packet processing unit 13 (described below), a variety of types of packet received from another IF unit of the packet processing apparatus that includes the internal I/F 12.

The packet processing unit 13 performs various processing on a packet received from a different packet processing apparatus and a packet received from another IF unit of the packet processing apparatus that includes the packet processing unit 13. More specifically, the packet processing unit 13 includes a flow identification unit 13a and a destination control unit 13b. The packet processing unit 13 stores path information 13c indicating which path is a Work path and which path is a Protection path. In addition, the packet processing unit 13 stores a flow table 13d associating a flow ID used for uniquely identifying each of flows contained in a link with an IF unit connected using the flow.

For example, the packet processing unit 13 stores the path information 13c including combinations of a link ID, a flow ID, and a status (e.g., "link 1, 1-10, Work", "link2, 11-30, Protection", and "link 3, 31-100, Work"). Thus, the packet processing unit 13 can identify in which link a fault occurs. The packet processing unit 13 can further identify whether a group of flows is "Work" or "Protection". In addition, the packet processing unit 13 stores a combination of a flow ID and an IF unit (e.g., "01, #1", "02, #2", . . . "100, #10") in the flow table 13d. Thus, the packet processing unit 13 can identify an IF unit using a flow ID.

The flow identification unit 13a can identify whether a packet received from the external I/F 11 is a maintenance packet or a data packet defined by S-OAM (CC). In addition, the flow identification unit 13a acquires a number assigned to a flow group (a flow ID) from the packet received from the internal I/F 12 and determines whether the packet is destined for the CPU 14 (i.e., destined for the IF unit including the flow identification unit 13*a*).

Figure 6:
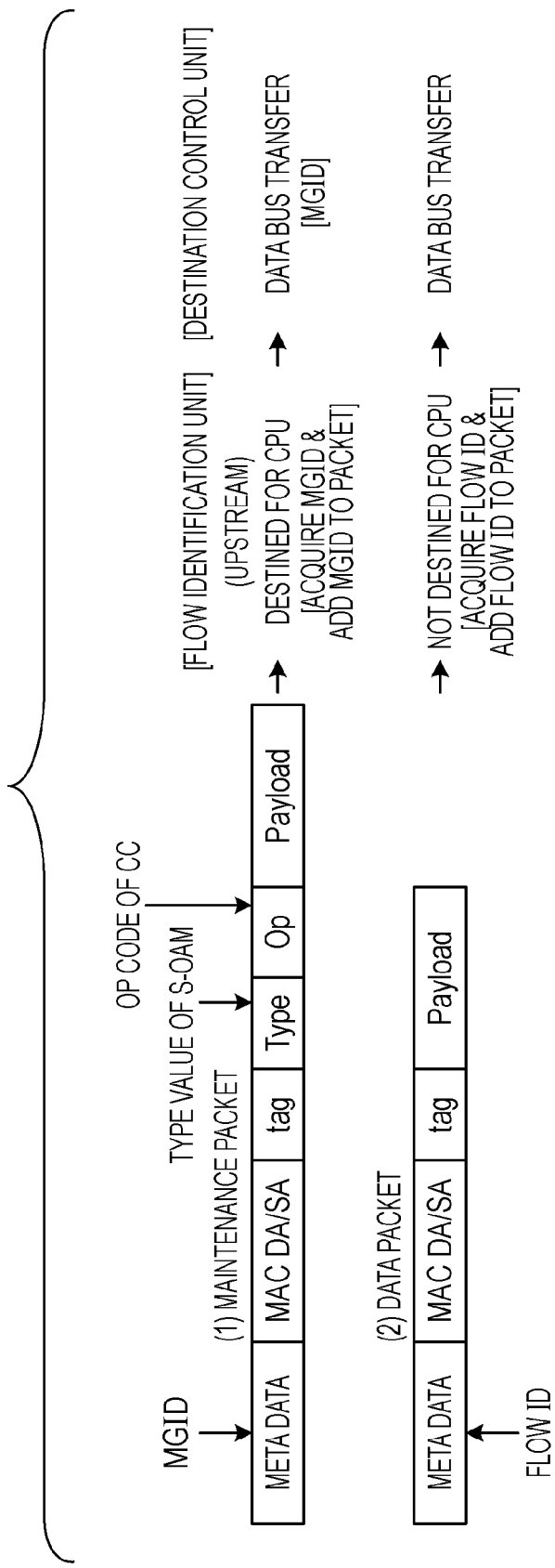
FIG. 6 is a schematic illustration of an exemplary packet processing flow according to an embodiment.

For example, the flow identification unit 13*a* determines whether a packet received by the external I/F 11 is a maintenance packet or a data packet using a "meta data" field of the packet, a "type" field including an S-OAM value, or an "Op" field including an op code of CC. As shown in FIG. 6, the meta data field is located at the head of the packet. The meta data is packet signal information used only inside the apparatus. If the received packet is a maintenance packet, the flow identification unit 13*a* attaches, to, for example, the meta data of the maintenance packet, the flow ID of the flow through which the maintenance packet is received and sends the packet to the destination control unit 13*b*. The destination control unit 13*b* is described in more detail below. Even when the received packet is a data packet, not a maintenance packet, the flow identification unit 13*a* sends the data packet to the destination control unit 13*b*.

In addition, the flow identification unit 13*a* acquires the flow ID from a maintenance packet sent from a different IF unit and determines whether the flow ID is one of the flow IDs representing the flows contained in the apparatus including the flow identification unit 13*a* by referring to the flow table 13*d*. If the maintenance packet sent from a different IF unit is one of the flows contained in the apparatus including the flow identification unit 13*a*, that is, if the maintenance packet is destined for the IF unit itself, the flow identification unit 13*a* outputs the received packet to the CPU 14. However, if the maintenance packet is not destined for the IF unit itself, the flow identification unit 13*a* discards the packet.

When a packet received by the external I/F 11is identified as a maintenance packet, the destination control unit 13*b* forwards the packet to the SW 3 via the data bus. More specifically, upon receiving a packet identified as a maintenance packet by the flow identification unit 13*a*, the destination control unit 13*b* forwards the received maintenance packet to the SW 3 connected using the high-speed data bus, not the MCU unit 2 connected using the low-speed control bus.

In addition, the destination control unit 13*b* identifies a flow corresponding to a Work path (a flow ID) indicated by the MCU unit 2 or the CPU 14 using the flow table 13*d*. Thereafter, the destination control unit 13*b* sends a data packet to the identified flow.

The CPU 14 examines the connection states of a Work path and a Protection path and performs path switching from a Work path to a Protection path and vice versa. More specifically, the CPU 14 sends an ICMP packet (e.g., a PING packet) or a CC packet of OAM to a Work path or a Protection path via the destination control unit 13*b*. Thereafter, when the CPU 14 receives a maintenance packet destined for the CPU 14 itself from the packet processing unit 13 (e.g., the flow identification unit 13*a*), the CPU 14 determines a path through which the maintenance packet is received using the header and the payload of the maintenance packet. In addition, the CPU 14 determines whether a fault occurs in the path using the header and the payload of the maintenance packet.

Note that the determination of whether a fault occurs in the path can be made using a widely used method in which, for example, a period of time from when a maintenance packet is sent to when a response packet is received is examined or it is determined whether a maintenance packet includes error information.

If the CPU 14 determines that a fault occurs, the CPU 14 updates the path information 13*c* in the packet processing unit 13 so that the maintenance packet is sent using a flow in the link that contains the Protection path, not a flow of the link that contains the Work path through which the maintenance packet is received. In this way, path switching is performed on a flow-by-flow basis. When a link for which a fault is detected is realized by a physical line, all of the Work paths contained in the link are immediately switched to the Protection paths.

Referring back to FIG. 1, the SW 3 sends a maintenance packet or a data packet to an IF unit using a high-speed data bus. More specifically, upon receiving a maintenance packet from an IF unit, the SW 3 copies the maintenance packet and sends the maintenance packet to all of the IF units connected thereto using the high-speed data bus by broadcasting.

In addition, the SW 3 sores a flow ID in association with an IF unit to which a flow having the flow ID is connected. For example, information "flow ID=01, IF unit=IF unit (#1)" is stored. Thereafter, upon receiving a packet (a maintenance packet or a data packet) from an IF unit, the SW 3 can identify an IF unit corresponding to the flow ID contained in, for example, the header of the packet and send the packet to the identified IF unit by unicasting.

Figure 3:
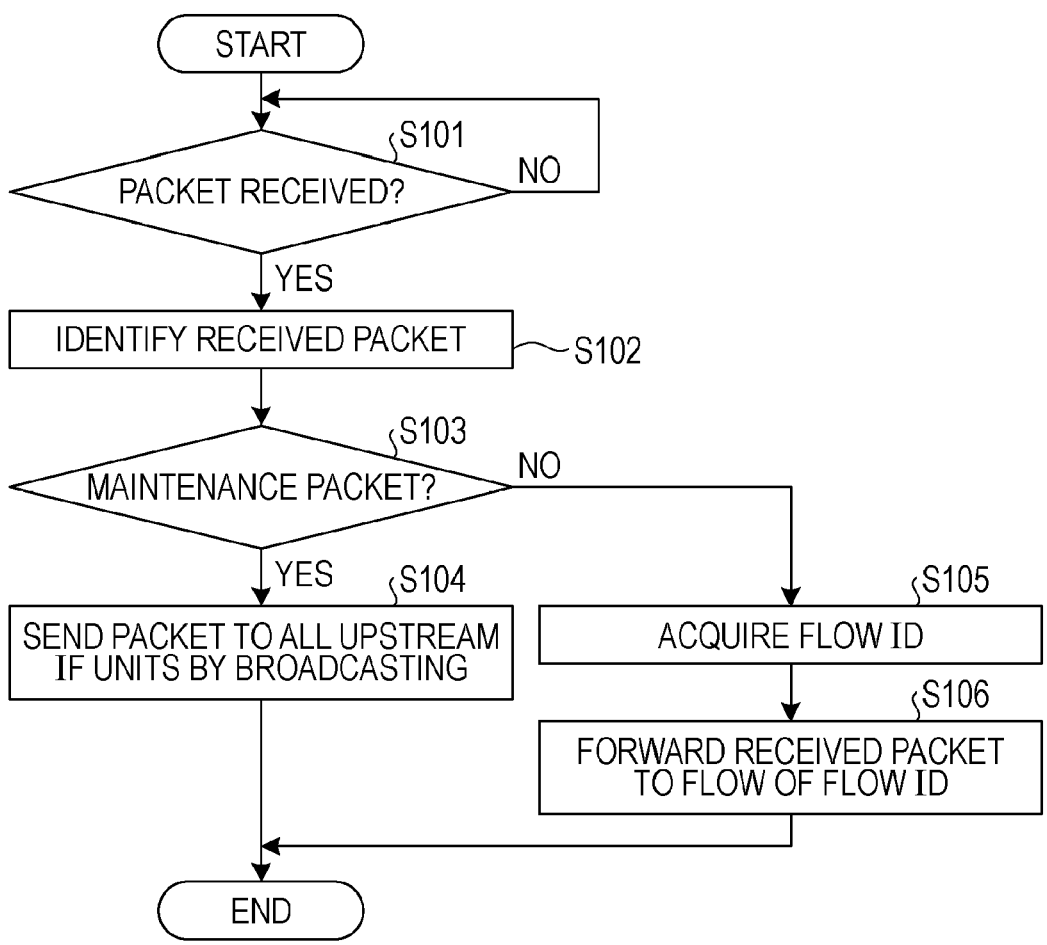
FIG. 3 is a flowchart illustrating an exemplary flow of processing performed by an IF unit disposed on an ingress side of the packet processing apparatus according to an embodiment.
Figure 4:
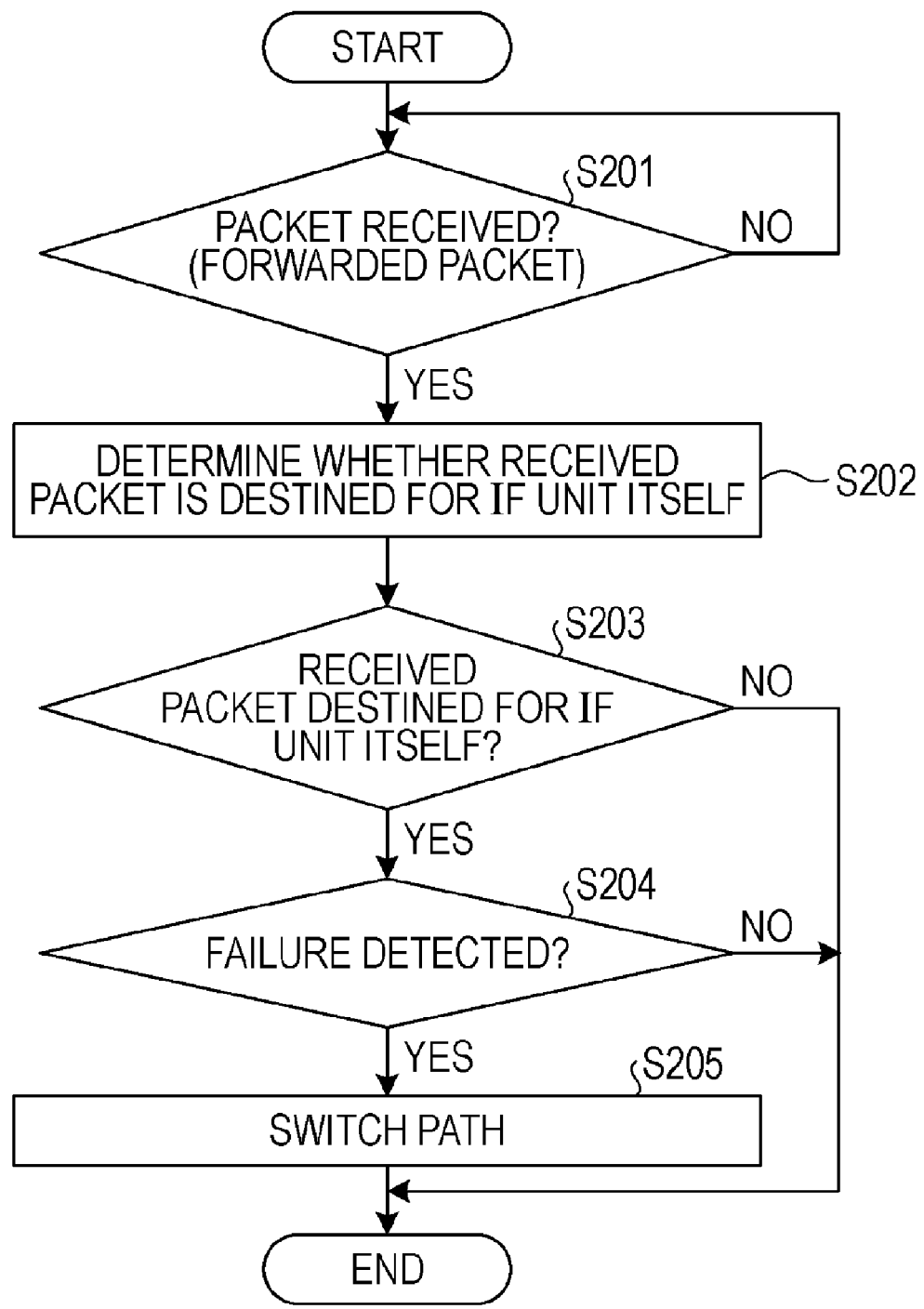
FIG. 4 is a flowchart illustrating an exemplary flow of processing performed by an IF unit disposed on an egress side of the packet processing apparatus according to an embodiment.

An exemplary flow of processing performed by the packet processing apparatus according to an embodiment is described next with reference to FIGS. 3 and 4. FIG. 3 is a flowchart illustrating an exemplary flow of processing performed by an IF unit disposed on the ingress side of the packet processing apparatus according to an embodiment. FIG. 4 is a flowchart illustrating an exemplary flow of processing performed by an IF unit disposed on the egress side of the packet processing apparatus according to an embodiment.

As shown in FIG. 3, upon receiving a packet from an external packet processing apparatus (Yes in operation S101), an IF unit on an ingress side determines whether the received packet is a maintenance packet or a data packet using, for example, the header of the received packet (operation S102).

Subsequently, if it is determined that the received packet is a maintenance packet (Yes in operation S103), the IF unit on an ingress side attaches the flow ID of a flow through which the maintenance packet is received to the maintenance packet and sends the maintenance packet to the SW 3. The SW 3 copies the maintenance packet and sends the maintenance packet to all of the IF units connected thereto using a high-speed data bus by broadcasting (operation S104). Note that, at that time, the SW 3 can identify an IF unit corresponding to the flow ID contained in, for example, the header of the received maintenance packet and send the packet to the identified IF unit by unicasting.

However, if it is determined that the received packet is not a maintenance packet, that is, if it is determined that the received packet is a data packet, (No in operation S103), the IF unit on an ingress side attaches the flow ID of a flow through which the data packet is received to the data packet and sends the data packet to the SW 3. The SW 3 sends the data packet to the IF unit corresponding to the flow ID (operations S105 and S106).

As shown in FIG. 4, upon receiving a maintenance packet from the SW 3 (Yes in operation S201), an IF unit on an egress side determines whether the maintenance packet is destined for the IF unit itself using the header of the received maintenance packet or the information contained in an internal message of the maintenance packet (operation S202).

Thereafter, when the IF unit on an egress side determines that the received maintenance packet is destined for the IF unit itself (Yes in operation S203) and if the IF unit on an egress side determines that a fault occurs using the packet (Yes in operation S204), the IF unit on an egress side performs path switching (operation S205).

However, if the IF unit on an egress side determines that the received maintenance packet is not destined for the IF unit itself (No in operation S203) or if the IF unit on an egress side determines that no fault occurs using the packet (No in operation S204), the IF unit on an egress side completes the processing.

As described above, according to an embodiment, like a data packet, even a maintenance packet can be sent to a different IF unit using the data bus, not the control bus. Accordingly, as in a wide area network in which a plurality of links are established between packet processing apparatuses and several ten thousand flows are established in each of the links, even when the number of packets traveling between apparatuses is increased, a maintenance packet can be sent to a different IF unit at high speed. Accordingly, each of the IF units of a packet processing apparatus can perform high-speed path switching when a fault occurs.

In addition, according to an embodiment, since the SW 3 can send a maintenance packet to IF units by broadcasting, the SW 3 need not determine whether the IF unit is a destination of the maintenance packet. Thus, control is simplified. Furthermore, since the SW 3 uses a high-speed data bus, the speed of path switching can be significantly increased even when the number of flows to be monitored is increased, as compared with path switching via a CPU using a low-speed control bus. Still furthermore, since high-speed path switching can be realized in existing apparatus configurations, the cost can be reduced, as compared with increasing the performance of a CPU. Yet still furthermore, since the CPU load can be reduced, the packet switching does not have a negative impact on the processing performed by the CPU.

While an embodiment has been described with reference to the case in which a maintenance packet is sent to IF units by broadcasting or is sent to an IF unit by unicasting, a maintenance packet can be sent to an IF unit or IF units using the other methods. An embodiment of the invention is described next with reference to the case in which a maintenance packet is sent to IF units by multicasting, as shown in FIGS. 5 to 8.

Like the above described embodiment, according to an embodiment, an IF unit of a packet processing apparatus includes path information 13*c* and a flow table 13*d*. The IF unit further includes an MGID information table. The MGID information table contains combinations of a flow ID and a multicast ID (MGID) (e.g., "01, 10", "02, 10", ... "100, 20"). Accordingly, the IF unit can identify an MGID using a flow ID.

In addition, according to an embodiment, the SW 3 includes an MGID-IF unit association table. The MGID-IF unit association table contains combinations of an MGID and an IF unit (e.g., "10, IF units (#1)-(#10)" and "20. IF units (#11)-(#20)"). Accordingly, the SW 3 can identify an IF unit using an MGID.

According to an embodiment, when a received packet is a maintenance packet, a packet processing apparatus 1 having such a configuration can further identify an IF unit that is a destination of the maintenance packet and send the maintenance packet to the identified IF unit.

Figure 5:
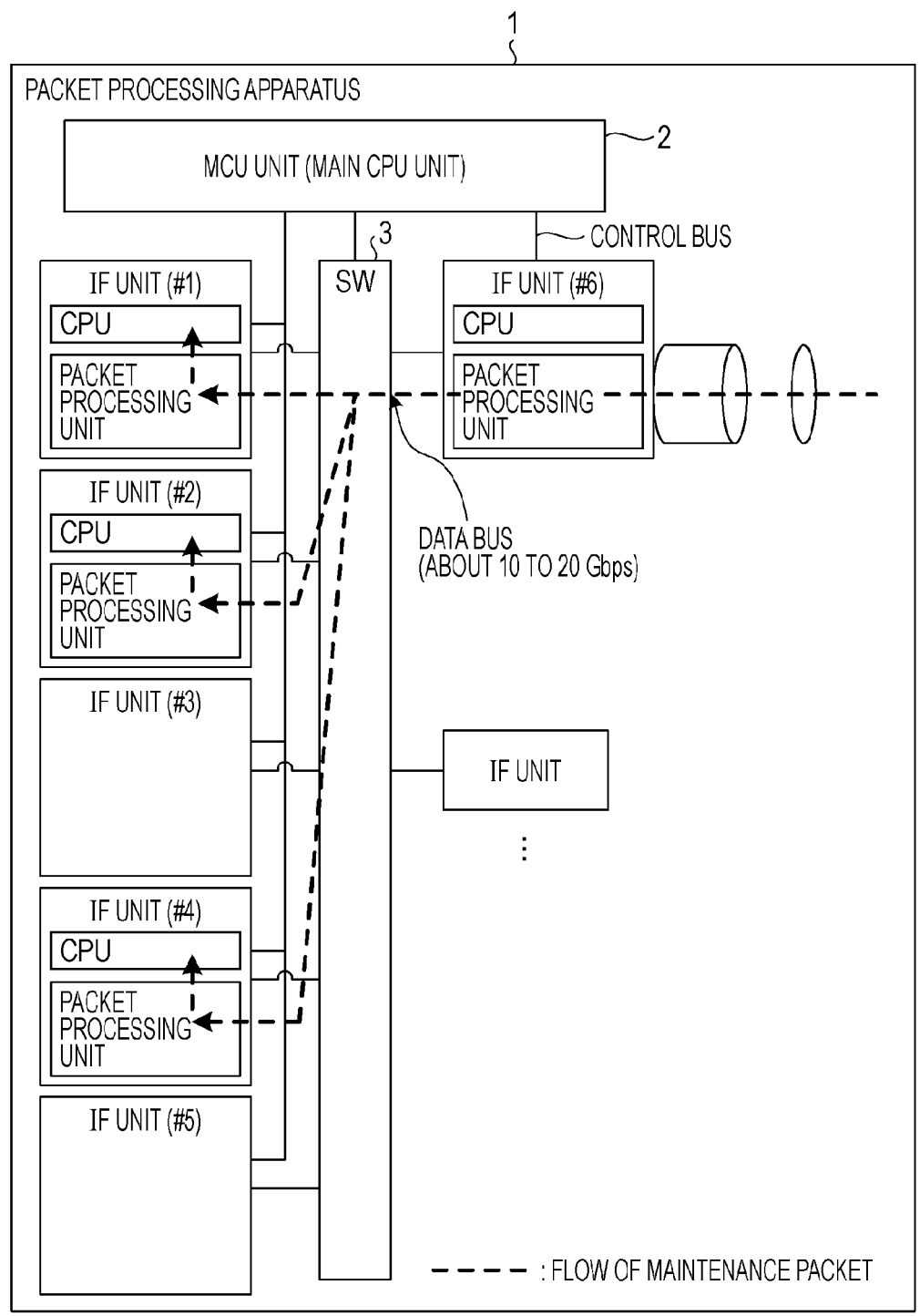
FIG. 5 illustrates an exemplary configuration of a packet processing apparatus according to an embodiment of the invention.

More specifically, as shown in FIG. 5, a packet processing unit of an IF unit (#6) acquires a flow ID from the received maintenance packet and, subsequently, acquires a multicast group number (MGID) from the flow table 13*d* using the flow ID. Thereafter, as shown in FIG. 6, the IF unit (#6) attaches the acquired MGID to the meta data of the received maintenance packet and sends the maintenance packet to a SW 3. At that time, a high-speed data bus is used as a packet transmission path. When the received packet is a data packet, not a maintenance packet, the IF unit (#6) attaches the flow ID to the data packet and sends the maintenance packet to a SW 3, as in existing cases, as shown in FIG. 6. FIG. 5 illustrates an exemplary configuration of a packet processing apparatus according to an embodiment. FIG. 6 is a schematic illustration of an exemplary packet processing flow according to an embodiment.

The SW 3 identifies IF units (the IF units (#1), (#2), and (#4) in this example) serving as destinations (the monitoring target) using the MGID contained in the packet and the MGID-IF unit association table and sends the maintenance packet to only the identified IF units by multicasting. Thereafter, the CPU of the IF unit to be monitored examines the connection states of the Work path and the Protection path. Subsequently, the CPU of the IF unit to be monitored updates table setting in the packet processing unit of the IF unit. Thus, the CPU switches a path from the Work path to the Protection path and vice versa.

Figure 7:
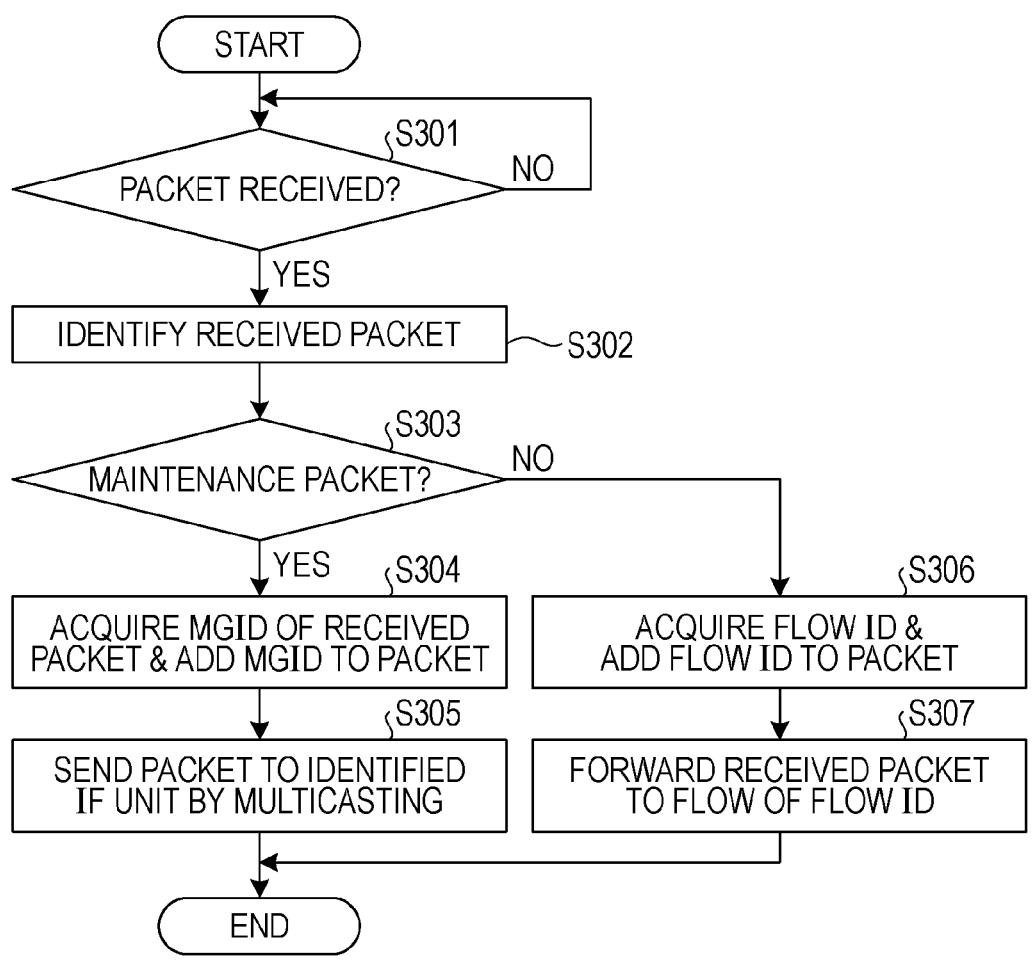
FIG. 7 is a flowchart illustrating the flow of processing performed by an IF unit of the packet processing apparatus on an ingress side according to an embodiment.
Figure 8:
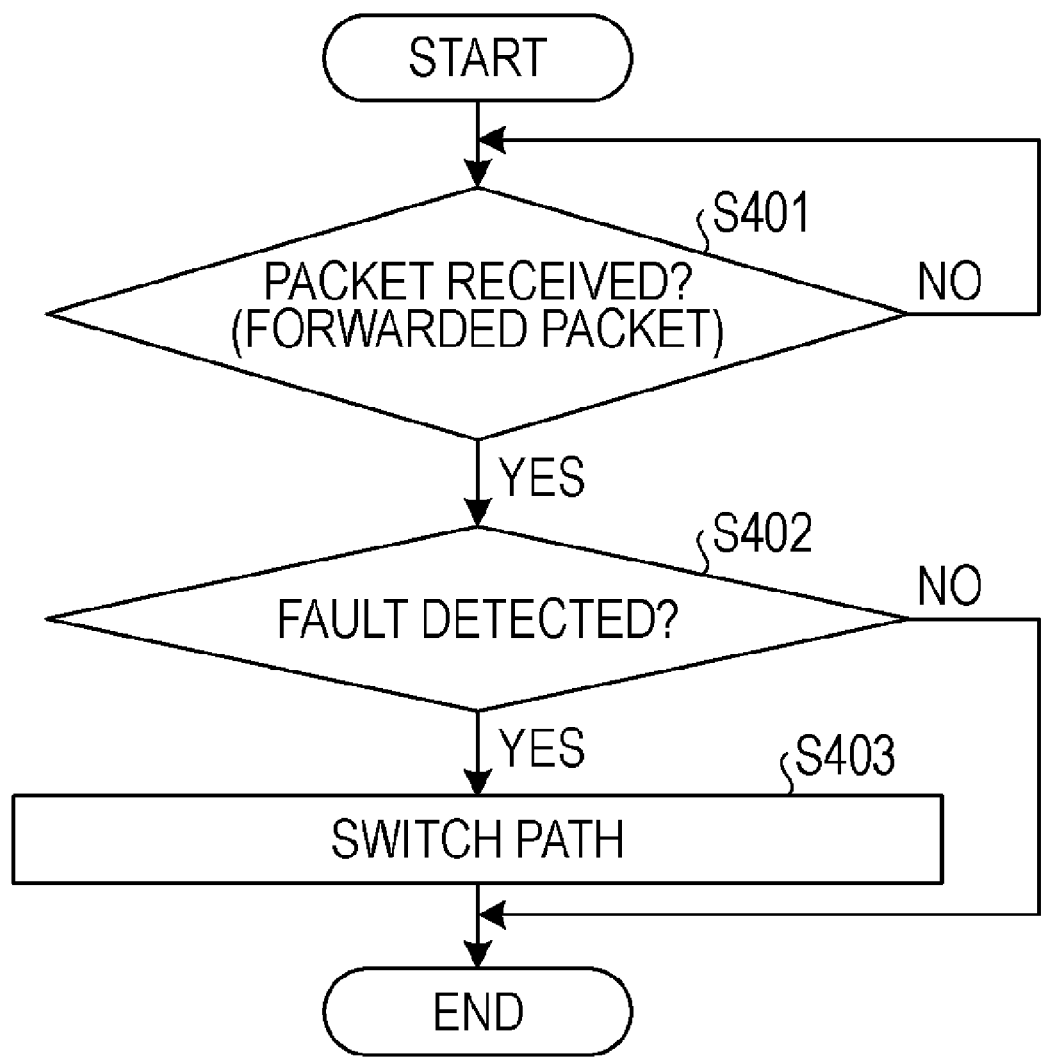
FIG. 8 is a flowchart illustrating the flow of processing performed by an IF unit of the packet processing apparatus on an egress side according to an embodiment.

The flow of processing performed by the packet processing apparatus according to an embodiment is described next with reference to FIGS. 7 and 8. FIG. 7 is a flowchart illustrating the flow of processing performed by an IF unit of the packet processing apparatus on an ingress side according to an embodiment. FIG. 8 is a flowchart illustrating the flow of processing performed by an IF unit of the packet processing apparatus on an egress side according to an embodiment.

As shown in FIG. 7, upon receiving a packet from an external packet processing apparatus (Yes in operation S301), an IF unit on the ingress side determines whether the received packet is a maintenance packet or a data packet using, for example, the header of the received packet (operation S302).

Subsequently, if the IF unit on the ingress side determines that the received packet is a maintenance packet (Yes in operation S303), the IF unit on the ingress side identifies the MGID using the flow ID of the flow through which the maintenance packet is received. The IF unit on the ingress side then attaches the MGID to, for example, the payload of the maintenance packet and sends the maintenance packet to the SW 3 (operation S304). Thereafter, the SW 3 identifies the IF unit serving as the destination on the basis of the MGID contained in the received maintenance packet and sends the maintenance packet to the identified IF unit via a high-speed data bus by multicasting (operation S305).

However, if the IF unit on the ingress side determines that the received packet is not a maintenance packet, that is, if the IF unit on the ingress side determines that the received packet is a data packet (No in operation S303), the IF unit on the ingress side attaches the flow ID of a flow through which the data packet is received to the data packet and sends the data packet to the SW 3. The SW 3 sends the data packet to an IF unit corresponding to the flow ID (operations S306 and S307).

As shown in FIG. 8, upon receiving a maintenance packet from the SW 3 (Yes in operation S401), an IF unit on an egress side determines whether a fault occurs using the received packet (operation S402). Unlike the above-described embodiment in which a maintenance packet is sent by broadcasting, the maintenance packet is sent by multicasting. Accordingly, the IF unit on an egress side receives only a maintenance packet destined for the IF unit itself. As a result, unlike the above-described embodiment, it is not necessary to determine whether the received maintenance packet is destined for the IF unit itself.

If the IF unit on an egress side determines that a fault occurs using the received packet (Yes in operation S402), the IF unit on an egress side performs path switching (operation S403). However, if the IF unit on an egress side determines that no fault occurs using the received packet (No in operation S402), the IF unit on an egress side completes the processing.

As described above, according to an embodiment, instead of using one maintenance packet for one flow, by using one representative maintenance packet for the flows passing through the same route, the path switching time can be further reduced.

Figure 9:
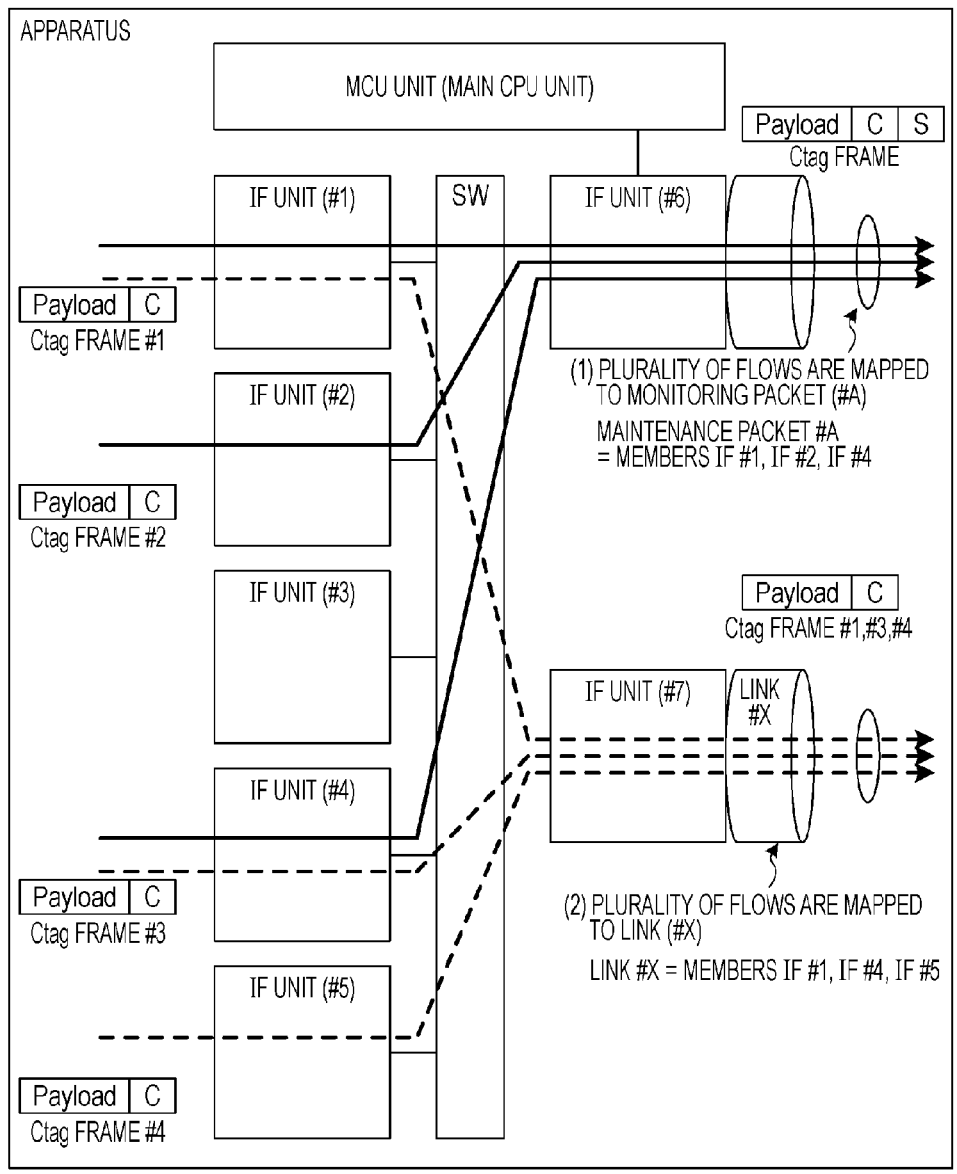
FIG. 9 illustrates a packet processing apparatus according to an embodiment of the invention.

The above embodiment has been described with reference to the case in which a maintenance packet is sent to IF units by broadcasting or is sent to an IF unit by unicasting, and an embodiment has been described with reference to the case in which a maintenance packet is sent to an IF unit by multicasting. However, a maintenance packet can be sent to an IF unit or IF units using the other methods. An embodiment of the invention is described next with reference to an example of a technique for sending a maintenance packet to IF units as shown in FIG. 9. In an embodiment, it is assumed that a maintenance packet is received from a different packet processing apparatus. That is, like the above-described embodiments, the determination of whether the received packet is a maintenance packet or a data packet is made. However, the description thereof is not repeated.

FIG. 9 illustrates a packet processing apparatus according to an embodiment. According to an embodiment, when a plurality of flows are mapped to one maintenance packet, the packet processing apparatus identifies a plurality of flows (the flow IDs) using the received maintenance packet. Thereafter, the packet processing apparatus according to an embodiment can control a SW so that the maintenance packet is sent to only the identified flows.

More specifically, as indicated by (1) shown in FIG. 9, in the packet processing apparatus according to an embodiment, a plurality of flows are mapped to a maintenance packet (#A), and that information is stored. That is, the packet processing apparatus stores information indicating a correspondence between an IF unit that received a Service tag frame and an IF unit that is a destination of a Customer tag frame encapsulated in the Service tag frame.

According to an embodiment, the packet processing apparatus having such a configuration receives, using the IF unit (#6), a Service tag frame (an Stag frame) having Customer tag frames (Ctag frames) to be input to the IF units (#1), (#2), and (#4) encapsulated therein. In such a case, the packet processing apparatus according to an embodiment can recognize that the "Stag frame" received by the IF unit (#6) has "Ctag frames" for the IF units (#1), (#2), and (#4) encapsulated therein. Accordingly, the packet processing apparatus can send the maintenance packet (the Ctag frames) to only the IF units (#1), (#2), and (#4).

In addition, according to an embodiment, when a plurality of flows are mapped to a link, the packet processing apparatus identifies the plurality of flows (the flow IDs) from the received maintenance packet. Thereafter, the packet processing apparatus according to an embodiment controls the SW so that the maintenance packet is sent to only the identified flows.

More specifically, as indicated by (2) shown in FIG. 9, a plurality of flows are mapped to a link (#X) Shared by the IF units, and the packet processing apparatus according to an embodiment stores that information. That is, the packet processing apparatus stores information for identifying IF units serving as the destinations from a link through which the maintenance packet is received. For example, the packet processing apparatus according to an embodiment knows that the members of the maintenance packet (a Ctag frame) received by the IF unit (#7) are the IF units (#1), (#4), and (#5).

According to an embodiment, upon receiving a maintenance packet using the IF unit (#7), the packet processing apparatus having such a configuration can recognize that the maintenance packet is destined for the IF units (#1), (#4), and (#5). Accordingly, the packet processing apparatus can send the maintenance packet (the Ctag frames) to only the IF units (#1), (#4), and (#5) via the SW connected using a high-speed data bus.

As described above, according to an embodiment, unlike existing packet processing apparatuses in which an MCU needs to make the copies of fault information for the number obtained by multiplying the number of packets by the number of flows or the number obtained by multiplying the number of links by the number of flows, a maintenance packet can be sent to the IF units at high speed. As a result, path switching can be performed at high speed when a fault occurs.

While the invention has been described with reference to the foregoing embodiments, the invention is not limited thereto. The invention can be also realized in a variety of other embodiments. Therefore, other different embodiments are described below using the following categories: "Monitoring", "Different Path Protection Group", "System Configuration" and "Program".

For example, according to the invention, the packet processing apparatus may display the information in a path connection storage unit (e.g., the path information 13c, the flow table 13d, and the MGID information table) on a display unit. In this way, for example, an administrator can manage the path state in real time.

In addition, for example, according to the invention, the packet processing apparatus may use a path protection ID so that the path protections are grouped. Thus, a plurality of path protections can be realized. In such a case, by providing the above-described database (DB) and tables for each of the path protection IDs, the packet processing apparatus according to the invention can perform the processing described in the above-described embodiments.

All or some of the processes described in the foregoing embodiments that are automatically executed can be performed manually. In addition, all or some of the processes described in the foregoing embodiments that are manually executed can be automatically performed using existing methods. Furthermore, the processing procedure, the control procedure, the particular names, and the information including various data and parameters can be freely changed, unless otherwise specifically indicated.

In addition, the components of the above-described apparatuses are only illustrative, and the components need not be physically configured as illustrated. That is, the particular form of the distribution and integration of the apparatuses is not limited to that in the illustrations. All or some of the components of the apparatus may be functionally or physically distributed and integrated in accordance with the load of each component and the usage environment. Furthermore, all or some of the processing functions performed by each of the apparatuses can be realized by a CPU and a program executed by the CPU or hardware formed from wired logic.

A variety of processes of the foregoing embodiments can be realized by executing predetermined programs using a computer system, such as a personal computer or a workstation. Accordingly, another embodiment of a computer system that executes a program that realizes functions similar to those of the foregoing embodiments is described next.

Figure 10:
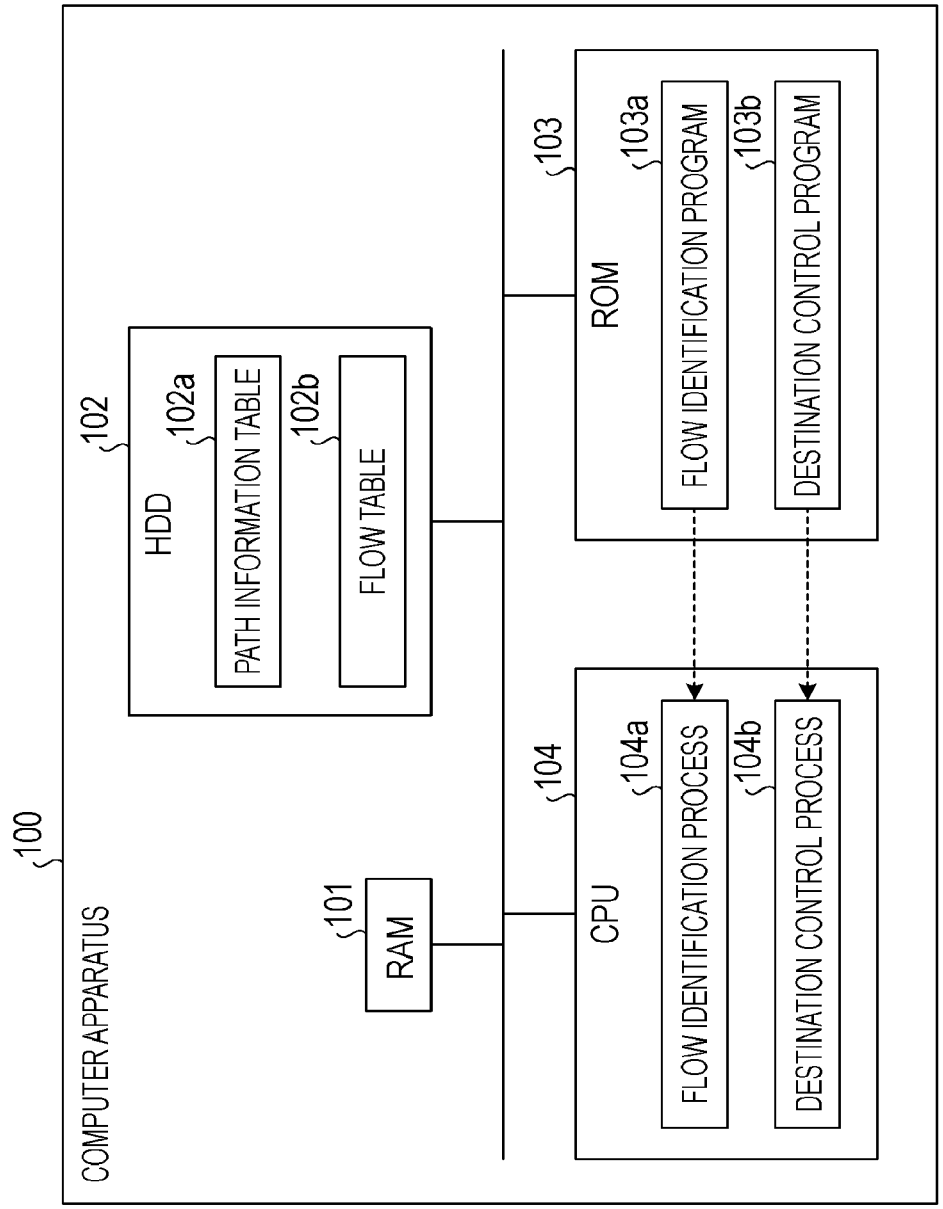
FIG. 10 illustrates an example of a computer system that executes a packet processing program.
Figure 11:
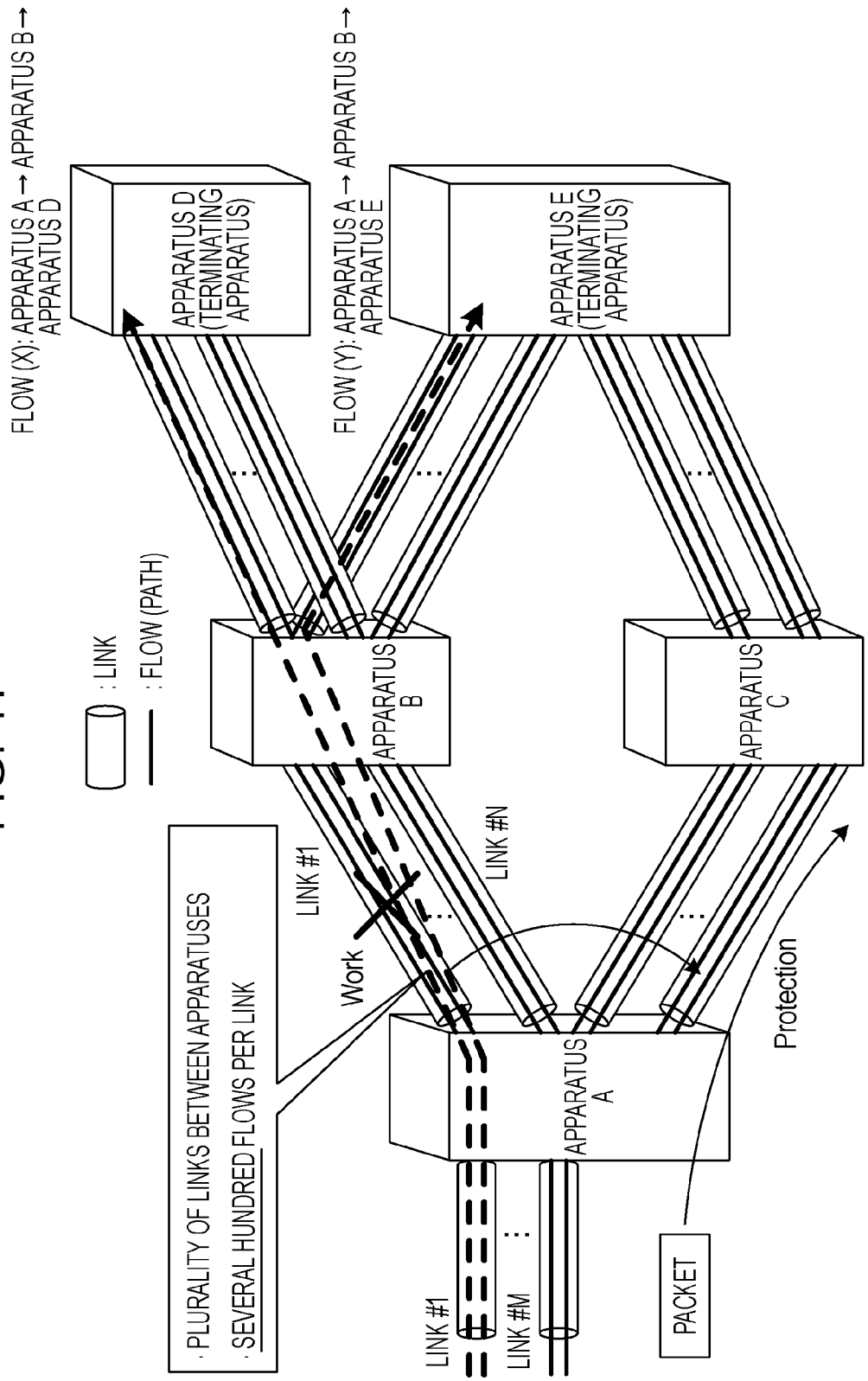
FIG. 11 illustrates an existing network.
Figure 12:
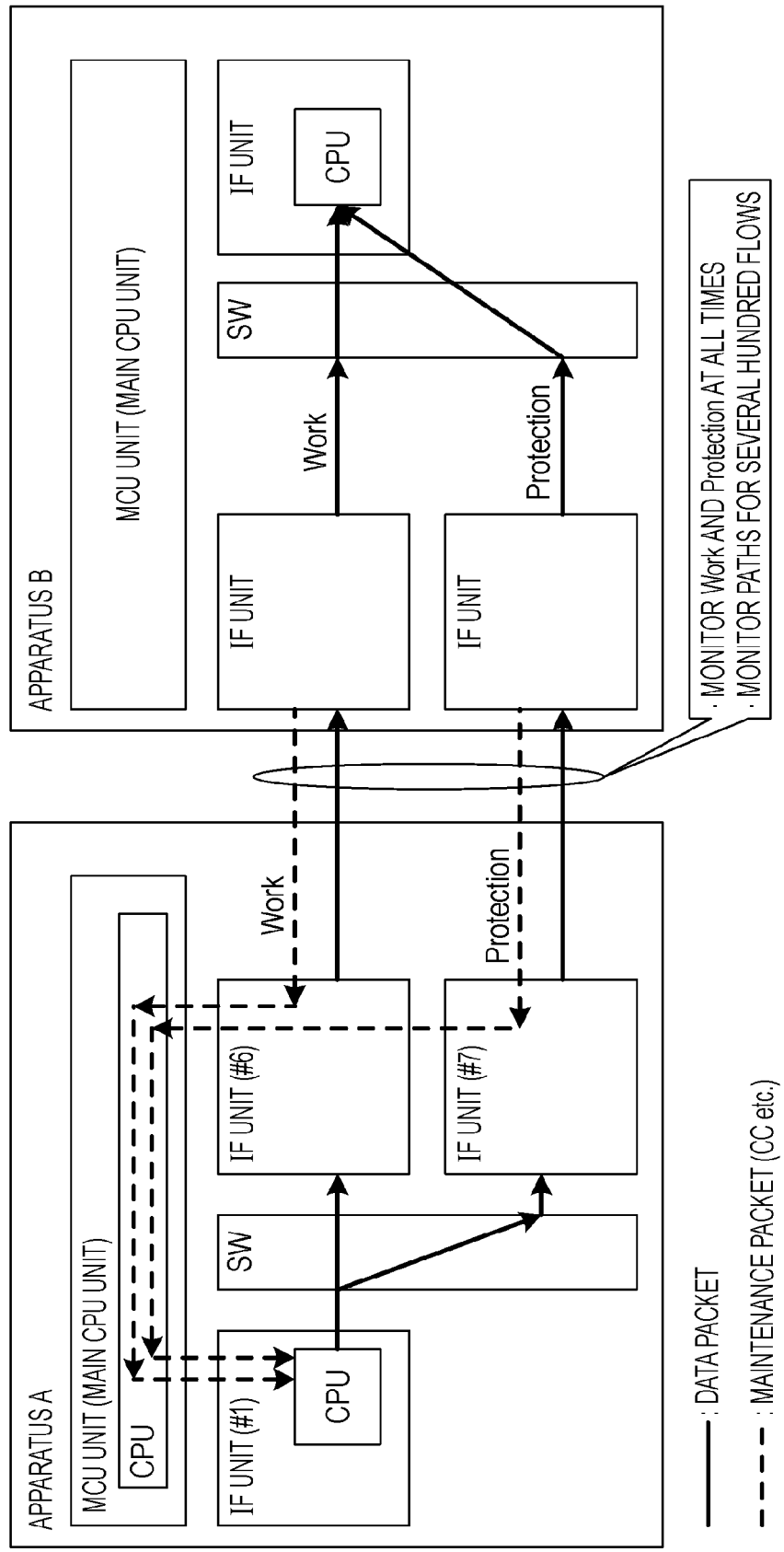
FIG. 12 illustrates a relationship among packet processing apparatuses in an existing network.
Figure 13:
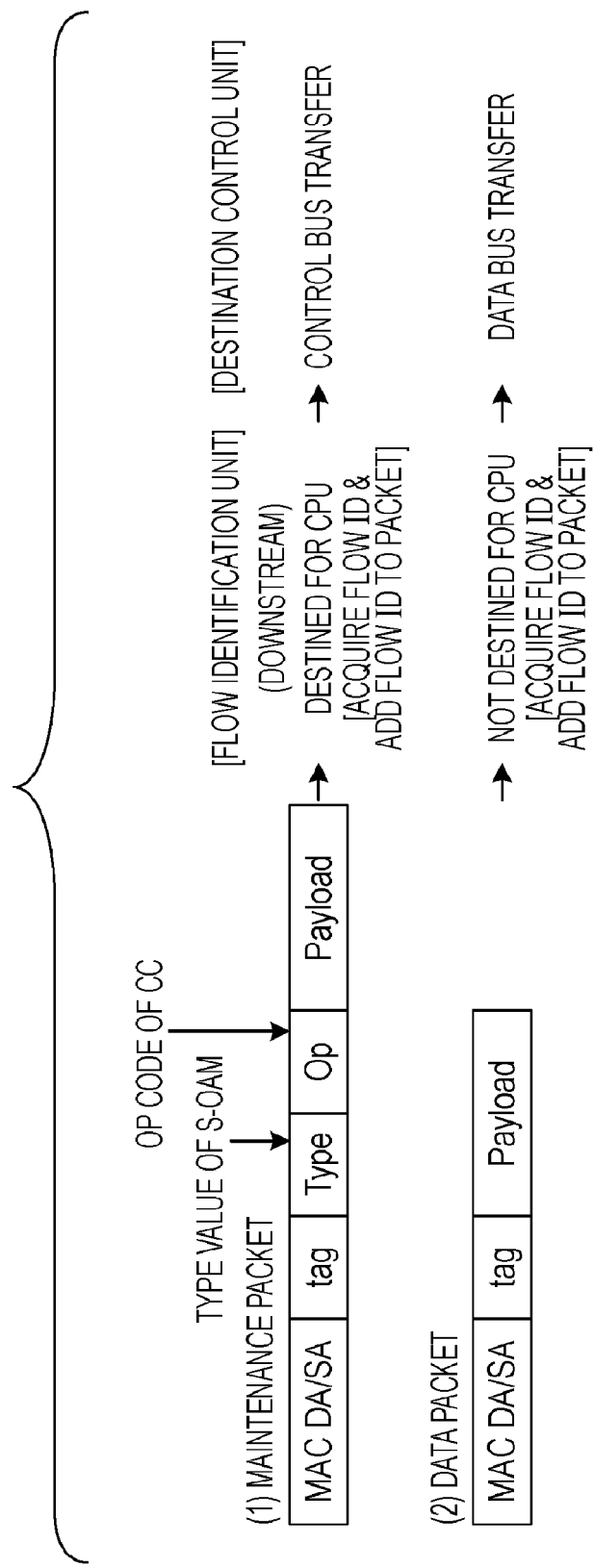
FIG. 13 illustrates the flow of existing packet processing.
Figure 14:
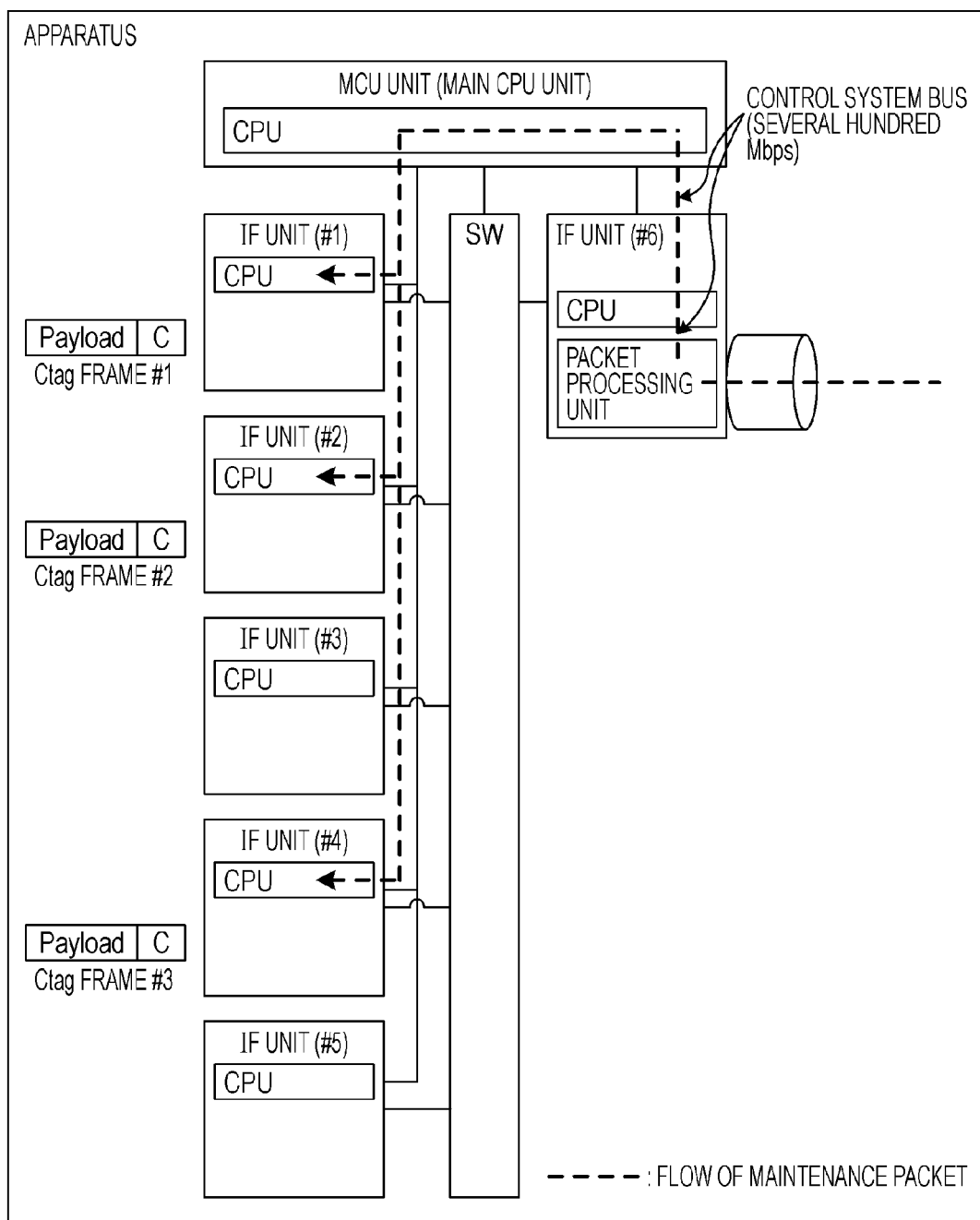
FIG. 14 illustrates an existing packet processing apparatus.

FIG. 10 illustrates an example of a computer system that executes a packet processing program. As shown in FIG. 10, a computer system 100 includes a random access memory (RAM) 101, a hard disk drive (HDD) 102, a read only memory (ROM) 103, and a CPU 104. Here, a program having functions similar to those of the foregoing embodiments is prestored in the ROM 103. That is, as shown in FIG. 10, a flow identification program 103a and a destination control program 103b are prestored in the ROM 103.

As shown in FIG. 10, when the CPU 104 reads and executes the flow identification program 103a and the destination control program 103b, a flow identification process 104a and a destination control process 104b are generated. Note that the flow identification process 104a corresponds to the flow identification program 13a shown in FIG. 2. Similarly, the destination control process 104b corresponds to the destination control unit 13b shown in FIG. 2.

The HDD 102 further stores a path information table 102a and a flow table 102b. Note that the path information table 102a corresponds to the path information 13c shown in FIG. 2, and the flow table 102b corresponds to the flow table 13d shown in FIG. 2.

Note that the flow identification program 103a and the destination control program 103b are not necessarily stored in the ROM 103. For example, the flow identification program 103a and the destination control program 103b may be stored in a removable physical medium, such as a flexible disk (FD), a compact disk-read only memory (CD-ROM), a magnetooptical (MO) disk, a digital versatile disc (DVD), or an IC card mounted in the computer system 100. In addition to the removable physical medium, the programs may be stored in a fixed physical medium, such as an HDD mounted inside or outside the computer system 100. In addition, the programs may be stored in a different computer system connected to the computer system 100 via a public line, the Internet, a local area network (LAN), or a wide area network (WAN). The computer system 100 may read the programs from the different computer system and execute the programs.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM. ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the invention(s) has(have) been described in detail, it should be understood that the various changes, substitutions, and alterations could be made hereto without departing from the spirit and scope of the invention, the scope of which is defined in the claims and their equivalents.

What is claimed is:

1. A packet processing apparatus comprising:
   a plurality of communication connecting units each connected with a communication partner apparatus using one of a work path and a protection path;
   connecting unit configured to connect, using a data bus, the plurality of communication connecting units with one another;
   determination unit configured to determine, when a packet sent from the communication partner apparatus is received by one of the plurality of communication connecting units, whether the packet is a maintenance packet that is used to monitor a connection state with the communication partner apparatus; and
   transmitting unit configured to transmit, when determining that the packet is a maintenance packet by the determination unit, the maintenance packet to the plurality of communication connecting units using the data bus via the connecting unit.

2. The packet processing apparatus according to claim 1, wherein the transmitting unit transmits the maintenance packet to the plurality of communication connecting unit by broadcasting.

3. The packet processing apparatus according to claim 1, wherein, when the received packet is the maintenance packet, the determination unit identifies the communication connecting unit for which the maintenance packet is destined, and
   the transmitting unit transmits the maintenance packet to only the communication connecting unit identified by the determination unit by multicasting.

4. The packet processing apparatus according to claim 1, wherein each of the communication connecting unit includes a plurality of links each containing a plurality of work paths or a plurality of protection paths, and each of the communication connecting unit is connected with a communication partner apparatus using the plurality of links, and
   the communication connecting unit includes storage unit, and the storage unit stores communication connection information indicating a destination of the maintenance packet in association with each of the links, and
   the transmitting unit identifies, from the storage unit, the communication connection information corresponding to a link through which the maintenance packet is received and transmits the maintenance packet based on the identified communication connection information.

5. The packet processing apparatus according to claim 1, comprising:
   path connection information storage unit for storing information regarding a path connection state between each of the communication connecting unit and the communication partner apparatus; and
   display unit for displaying the information stored in the path connection information storage unit.

6. The packet processing apparatus according to claim 1, comprising:
   path switching unit for determining whether a fault occurs using the maintenance packet and switching between paths connected with the communication partner apparatus when determining that a fault occurs.

* * * * *